United States Patent [19]
Müller et al.

[11] Patent Number: 5,878,677
[45] Date of Patent: Mar. 9, 1999

[54] PROCESS FOR COOLING AND CLEANING FLUE GASES

[75] Inventors: Patrick Müller, Schaffhausen; Hans Rüegg, Wohlen, both of Switzerland

[73] Assignee: Von Roll Umelttechnik AG, Zurich, Switzerland

[21] Appl. No.: 702,552

[22] PCT Filed: Jan. 8, 1996

[86] PCT No.: PCT/CH96/00008

§ 371 Date: Oct. 24, 1996

§ 102(e) Date: Oct. 24, 1996

[87] PCT Pub. No.: WO96/21504

PCT Pub. Date: Jul. 18, 1996

[30] Foreign Application Priority Data

Jan. 10, 1995 [CH] Switzerland .................. 00 054/95

[51] Int. Cl.[6] ........................................... F23J 11/00
[52] U.S. Cl. ................... 110/345; 110/245; 110/216; 422/147
[58] Field of Search .................. 110/245, 345, 110/216; 165/104.16; 122/40; 423/244.07; 422/145–147

[56] References Cited

U.S. PATENT DOCUMENTS

| 4,522,131 | 6/1985 | Lebesgue ........................ 110/216 X |
|---|---|---|
| 4,613,344 | 9/1986 | Henrich et al. ................. 165/104.16 X |
| 4,747,356 | 5/1988 | Beisswenger et al. ............. 110/245 X |
| 4,789,580 | 12/1988 | Hirsch et al. . |
| 4,877,397 | 10/1989 | Tatebayashi et al. ............... 110/245 X |
| 5,049,361 | 9/1991 | Harandi et al. ..................... 110/245 X |
| 5,347,953 | 9/1994 | Adbulally ............................ 110/245 X |

*Primary Examiner*—Henry Bennett
*Assistant Examiner*—Susanne C. Tinker
*Attorney, Agent, or Firm*—Oblon, Spivak McClelland, Maier, & Neustadt, P.C.

[57] ABSTRACT

To cool and clean flue gases from a furnace of a waste incineration plant, the flue gases are fed to a fluidized-bed reactor (6) as fluidizing gases in a first stage (1), into which solid sorbents are simultaneously introduced to remove gaseous pollutants. Solids discharged from the fluidized-bed reactor (6), together with the unused sorbents, are preferably recirculated via a fluid-bed cooler (15). Whereas in the first stage (1), at temperatures above 600° C., optimum conditions, in particular for removing $SO_2$, are created, the flue gases are further cooled and treated in a second stage (2a, 2b, 2c). In a second circulating fluidized bed, at temperatures below 600° C., excellent conditions are created for HCl removal. In addition to the optimum gas cleaning, efficient cooling is also achieved, corrosion problems on heat-transfer surfaces also being solved.

14 Claims, 3 Drawing Sheets

PROCESS FOR COOLING AND CLEANING FLUE GASES

The invention relates to a process for cooling and cleaning flue gases.

The function of waste treatment is now passed on to refuse incineration plants. The wastes are substantially mineralized, utilizing the thermal energy contained in the waste. Two primary problems are posed by this: one is the most complete recovery possible of energy from the hot flue gases, the other is flue gas cleaning, i.e. removal of environmental problem substances from the hot flue gases.

From the multiplicity of substances contained in the waste, there are formed in the incineration a large number of pollutants. The most important gaseous pollutants in flue gas to be mentioned are: hydrochloric acid HCl (and $Cl_2$) from the incineration of PVC-containing wastes, and sulphur dioxide $SO_2$ from the incineration of rubber, sewage sludge, paper and dyestuffs. In the incineration of such materials, in contrast to other fuels, such as coal for example, very large amounts of HCl are formed.

In most countries, strict emission limit values are now prescribed by the legislator for the emission of these pollutants, i.e, for example, in Switzerland by the Clean Air Ordinance (LRV), in Germany by the Federal Air Pollution Control Ordinance (BImSchV) and in the EC by the Directives on Incineration of Municipal Refuse. Thus, the 17th BImSchV in Germany prescribes a clean gas limit value of 10 mg/m$^3$ (S.T.P.) for HCl (based on dry flue gas containing 11% $O_2$).

A typical refuse incineration plant is made up as follows: the waste materials are incinerated in a furnace plant having an afterburning chamber. The flue gases produced in the incineration flow through the waste-heat boiler downstream of the furnace for heat recovery and then enter the downstream flue gas cleaning devices, the pollutants being separated off at low temperatures. "Wet processes" are in this case most frequently employed for flue gas cleaning, i.e. treatment of the flue gases in a single- or multistage wet scrubber. "Dry processes" are also sometimes employed, in which the gaseous pollutants are sorbed on fine-grained, solid sorbents. These solids are brought into contact with the flue gas stream in a suitable manner for this purpose.

This typical structure of a refuse incineration plant is accompanied by some disadvantages. Since the flue gas cleaning is only performed downstream of the boiler end, the very aggressive pollutants flow through the boiler, where they lead to serious corrosion problems. The highest corrosion rates occur in this case on the hottest heat-transfer surfaces, i.e. on the superheater heating surfaces. In this case there are two principal mechanisms: one is the direct high-temperature corrosion of the heat-transfer surfaces by corrosive substances in the flue gas, in particular by HCl; the other is the deposit formation on the heat-transfer surfaces by furnace fly ash containing sticky, corrosive substances, with heavy corrosion under these deposits. HCl again plays a dominant role here. These serious corrosion phenomena on hot heat-transfer surfaces restrict the steam temperatures attainable and thus, if the steam is used for power generation, the electrical efficiency of the incineration plant. In addition, they lead to periodic shutdowns of the plant and complex boiler overhauls at great expense to remove the deposits on the heat-transfer surfaces.

Arranging dry cleaning processes downstream of the boiler has the further disadvantage that at the low temperatures prevailing there, for reasons of reaction kinetics, sufficient removal of $SO_2$ can only be achieved using great excesses of sorbent.

The dry removal of $SO_2$ and HCl is known. Sorbents which are suitable are the substances contained in natural limestone, calcium carbonate $CaCO_3$ and dolomite $CaMg(CO_3)_2$, and also calcium oxide CaO and calcium hydroxide $Ca(OH)_2$ and the analogous alkaline earth metal compounds (for example MgO, $Mg(OH)_2$ etc.). $CaSO_4$ and $CaCl_2$ are formed as products of the removal. Typical concentration of the pollutants in uncleaned flue gas are 1,000 mg/m$^3$ (S.T.P.) of HCl and 300 mg/m$^3$ (S.T.P.) of $SO_2$. A typical flue gas composition in the incineration of domestic refuse is 70% $N_2$, 11% $CO_2$, 7% $O_2$ and 12% $H_2O$.

H. Michele: Rauchgasreinigung mit trockenen Sorbentien—Möglichkeiten und Grenzen [Flue Gas Cleaning with Dry Sorbents—Possibilities and Limits], Chem.-Tng.-Tech. 56 (1984) No. 11 pp. 819–829 discloses the equilibrium position and kinetics of the reactions relevant for the removal. The starting material calcium hydroxide $Ca(OH)_2$ decomposes at temperatures above 400° C. in a reaction termed dehydration to form calcium oxide CaO. The starting material calcium carbonate $CaCO_3$ decomposes at a temperature above 750° C. in a reaction termed decarbonation to form calcium oxide CaO. For a clean gas concentration of 100 mg/m$^3$ (S.T.P.) of HCl, the equilibrium temperature of the reaction of HCl with the sorbents is between 570° C. and 540° C. at 5 to 20% water content in the flue gases. Therefore, at higher temperatures, sufficient removal no longer occurs. Removal of $SO_2$ proceeds at temperatures below 600° C. at unsatisfactory reaction rate.

C. Weinell et al.: Hydrogen Chloride Reaction with Lime and Limestone: Kinetics and Sorption Capacity, *Ind. Eng. Chem. Res.* 1992, 31, 164–171 disclose that the removal of HCl proceeds reversibly, i.e. HCl already removed is released again at temperatures above 600° C.

DE 3023480 discloses a process for hot desulphurization of combustion gases or reduction gases using lime or dolomite or the corresponding calcined products (desulphurization agents), in which the combustion gases or reduction gases are introduced as fluidizing gas into a fluidized-bed reactor which contains the desulphurization agents. In the fluidized-bed reactor, a temperature of 700° C. to 1100° C. is set and a stoichiometric ratio of 1.2 to 2.0 (calculated as Ca:S) is set. The solids discharged with the flue gases from the fluidized-bed reactor are removed in a dust separator and returned again to the fluidized-bed reactor, so that a circulating fluidized bed is formed. This process has the disadvantage that at the temperature selected and the stoichiometric ratio selected, only an amount of HCl unsatisfactory for domestic refuse incineration could be removed. For typical pollutant concentrations of 1000 mg/m$^3$ (S.T.P.) of HCl and 300 mg/m$^3$ (S.T.P.) of $SO_2$ in the flue gas, the stoichiometric ratio of 2.0 calculated as Ca:S corresponds to a stoichiometric ratio of 0.5 calculated as Ca:(S+0.5 Cl), i.e. far too little sorbent would be available for the combined removal of $SO_2$ and HCl. However, in particular, the unfavourable equilibrium position of the sorption reaction, which at higher temperatures shifts to the side of the gaseous starting material HCl, prevents sufficient HCl removal. Thus, the equilibrium concentration of HCl in the gas phase at 700° C. and 5% water content is already 450 mg/m$^3$ (S.T.P.), i.e. only an insignificant amount of HCl is removed.

DE 33 07 848 discloses a process for afterburning and cleaning process off-gases containing combustible constituents in metallurgy, in which the process off-gas and the oxygen-containing gases required for the combustion. are introduced separately into the fluidized-bed reactor of a circulating fluidized-bed, in which the process gas is simultaneously reburnt and cleaned. In the fluidized-bed reactor, a temperature of 700° C. to 1100° C. is set and a stoichiometric ratio of 1.2 to 3.0 (calculated as Ca:S) is set. The solids discharged with the flue gases from the fluidized-bed reactor are removed in a dust separator and returned again to the fluidized-bed reactor, so that a circulating fluidized bed is formed. This process also has the disadvantage that at the temperature selected and the stoichiometric ratio selected, far too little HCl is removed.

WO 88/08 741 discloses cooling hot process off-gases in a circulating fluidized bed, the process gas being cooled in a mixing chamber containing recirculated cooled solids and recirculated cooled process gas. However, no gas cleaning takes place in the fluidized bed, and the gas recycling increases the amount of flue gas, which is disadvantageous, since it means an increase in the size of the downstream apparatuses. Increasing the amount of flue gas also means decreasing the amount of heat recoverable in the boiler, since the exhaust air heat loss is greater. This decreases the boiler efficiency.

DE 40 23 060 discloses introducing hot process off-gases through a central orifice into a bath-shaped, fixed fluidized bed, cooled solids flowing from the fluidized bed via the inner edge of the bath into the process gas stream and cooling it. Gas cleaning does not take place here either, and the disadvantage results that the additional fluidizing air required increases the flue gas stream with adverse consequences.

EP-A-0 529 243 discloses effecting a complete dioxin breakdown in process gases by means of catalytic material in a first fluidized-bed reactor. In a down-stream, second fluidized-bed reactor, rapid cooling takes place, so that no dioxin can form any longer.

EP-A-0 328 874 discloses cooling and simultaneously cleaning refuse incineration exhaust gases by indirect heat transfer in stages in a plurality of serially arranged exhaust gas coolers constructed as tube-bundle heat exchangers. In this case, in each of the at least three stages, a partial quantity of sorbent is introduced into the exhaust gas stream, which quantity is substoichiometric in relation to the amount of pollutant present in the exhaust gas.

The object underlying the present invention is to propose a process of the type mentioned at the outset which permits both optimal flue gas cleaning and also more efficient flue gas cooling, at the same time the risk of corrosion on heat-transfer surfaces being substantially eliminated.

This object is achieved according to the invention by the features specified in the specification and claims.

The advantages achieved by the invention are to be seen, in particular, in the fact that, owing to the two-stage gas cleaning, its first stage proceeds in a circulating fluidized bed and owing to the preset temperature conditions, optimal removal of both $SO_2$ and HCl with simultaneous optimum utilization of the sorbent are achieved.

Since the gas-solids flow is distinguished by a much better heat transfer to walls than a gas flow, the combination of dry gas cleaning and fluidized-bed boiler additionally permits a highly efficient heat decoupling. As a result, the size of the boiler can be greatly decreased in comparison with a conventional unit.

In the fluidized-bed reactor of the first stage, the walls are designed as heat-transfer surfaces and any additional heat-transfer surfaces are arranged directly in the fluidized bed.

In addition, the design as a circulating fluidized bed permits a solution of the corrosion problems. On the one hand, the erosive action of the gas-solids flow prevents the formation of corrosive deposits on the heat-transfer surfaces in the fluidized bed. On the other hand, sticky flue dusts introduced into the fluidized-bed reactor combine with the circulating solids even before the flue dusts come into contact with the heat-transfer surfaces.

In order, additionally, to avoid the high-temperature corrosion of the heat-transfer surfaces by contact with corrosive substances in the flue gas, i.e. to permit the changeover to higher steam temperatures, some of the heat-transfer surface of the first stage is moved out of the flue gas path into an external fluid-bed cooler. The solids particles act as an intermediate medium for heat transfer from the fluidized-bed reactor into the fluid-bed cooler: some of the circulating solids are passed to the fluid-bed cooler. The cooled solids from the fluid-bed cooler are recycled to the fluidized-bed reactor, where it absorbs heat from the flue gas stream. In the context of the invention, the heat-transfer surfaces most severely affected by corrosion are preferably then arranged in the fluid-bed cooler, that is outside the flue gas path. These heat-transfer surfaces are the hottest heat-transfer surfaces, that is the superheater surfaces. This achieves a great reduction in the corrosion rate. The conversion to higher steam temperatures which is then possible considerably improves the electrical efficiency of the incineration plant. At the same time, these measures, because of the decreased tendency to deposit formation and corrosion, decrease the expenditure on overhaul, and thus increase the plant availability.

The invention is now described in more detail with reference to the drawings.

Three variants of the process of the invention are shown in the drawings and are described in more detail below.

Figure 1:
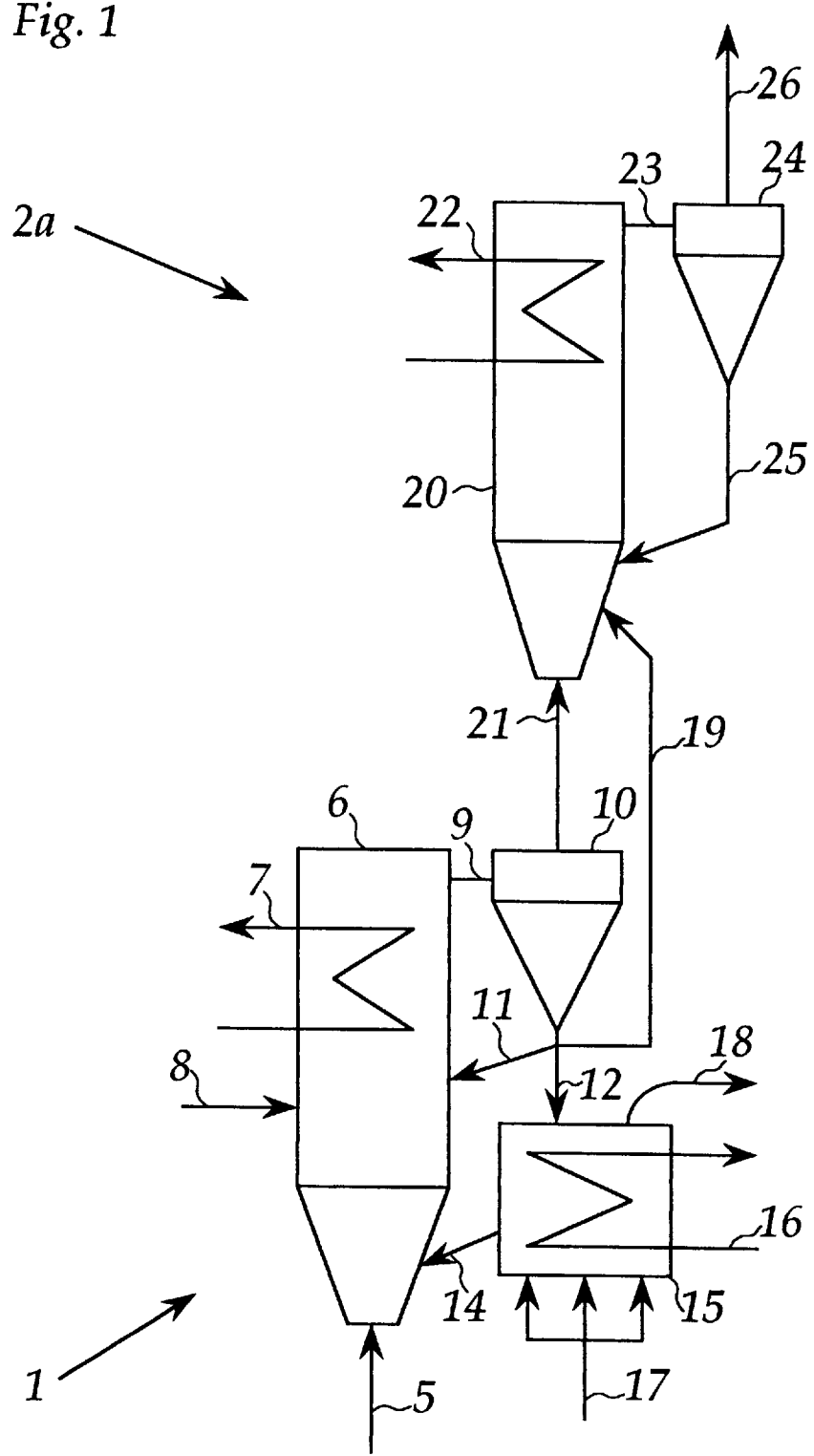
FIG. 1 shows a flow diagram of a first process variant.

According to FIG. 1, hot flue gases from a furnace, which is not shown in the drawing, of a plant for thermal waste treatment are introduced (indicated by an arrow S) as fluidizing gases into a fluidized-bed reactor 6. The walls of the fluidized-bed reactor 6 are designed as heat-transfer surfaces; further heat-transfer surfaces may possibly be arranged directly in the fluidized bed. These cooling surfaces are designated in their entirety by the symbol 7 in FIG. 1. The fluidized-bed reactor 6 is operated at a gas velocity of a magnitude such that at least some of the solids particles are discharged from the fluidized-bed reactor 6 together with the flue gas stream. The solids particles, having arrived via a line 9 in a dust separator 10, which can be designed, for example, as a cyclone, a dust filter or as an electrostatic precipitator, are separated from the flue gas stream. Some of the solids are recycled to the fluidized-bed reactor 6, so that a circulating fluidized bed is formed; in this case, the solids can be returned to the fluidized-bed reactor 6 directly via a line 11 or at least in part via line 12, an external fluid-bed cooler 15 and a line 14. The part of the solids conducted via the fluid-bed cooler 15 is cooled in a fixed fluidized bed (fluid bed) by direct or indirect heat transfer; corresponding heat-transfer surfaces are designated by the symbol 16. A fluidizing gas necessary for operating the fluid-bed cooler 15 is fed to the fluid-bed cooler 15 via a line 17 and is take off again (line 18), for further utilization, above the fluid bed.

A first stage of the process according to the invention, which is designated in the flow diagram of FIG. 1 by 1, proceeds in the fluidized-bed reactor 6 and its assigned dust separator 10 and fluid-bed cooler 15. Via a line 8, fine-grained dry sorbents are introduced into the fluidized-bed reactor 6 and admixed with the solids particles of the fluidized bed. The circulating fluidized bed of the first stage 1 is distinguished by a very good gas-solids mixing. In addition, the recirculated solids effect a highly homogeneous temperature distribution in the entire fluidized-bed reactor 6. These prerequirements create optimum conditions for good $SO_2$ removal, which is carried out at a temperature above 600° C. Preferably, the first stage is operated at a temperature between 600° C. and 1200° C. In this temperature range, the $SO_2$ sorption proceeds at a sufficient reaction rate.

The first stage 1 is operated at a stoichiometric ratio of at least 1.0 calculated as Ca:(S+0.5 Cl). At typical pollutant concentrations of 1000 mg/m³ (S.T.P.) of HCl and 300mg/m³ (S.T.P.) of $SO_2$ in the flue gas, this is equivalent to a stoichiometric ratio of at least 3.9 calculated as Ca:S, i.e. in a great excess of sorbent, based on the $SO_2$ removal principally occurring in this stage. This permits excellent $SO_2$ removal.

The flue gases leaving the dust separator 10 are introduced into a second stage 2a of the process, by being fed as fluidizing gases via a line 21 to a second fluidized-bed reactor 20, where HCl removal and further cooling of the flue gases takes place. The fluidized-bed reactor 20 is equipped with heat-transfer surfaces or cooling surfaces 22, again the walls being designed as heat-transfer surfaces or additional heat-transfer surfaces being arranged directly in the fluidized bed. The fluidized-bed reactor 20 is likewise operated at a gas velocity sufficiently high that at least some of the solids particles are discharged from the fluidized-bed reactor 20 together with the flue gases and are fed via a line 23 to a dust separator 24. The solids are separated off from the gas stream there and are recirculated via a line 25 to the fluidized-bed reactor 20. In principle, there is also the possibility here of using an external fluid-bed cooler.

A smaller part of the solids separated off in the dust separator 10 of the first stage 1 is not recirculated, but is fed via a line 19 to the fluidized-bed reactor 20 of the second stage 2a. With these solids, a large amount of unused sorbents also passes from the first stage 1 into the second stage 2a. The sorbent requirement of the second stage 2a is covered in this manner, since the first stage is operated with a great excess with respect to $SO_2$ removal. The circulating fluidized bed of the second stage 2a creates good preconditions for HCl removal by the very good gas-solids mixing and long residence times of the sorbents. This stage is operated at temperatures below 600° C., so that sufficient removal of HCl is ensured. Since no solids can pass back to the first stage 1 from the second stage 2a, this also avoids the risk that HCl already removed is released again as a result of the reversible HCl sorption.

The cleaned and cooled flue gases are conducted via a line 26 to a conventional boiler, which is not shown in the drawing, in which they are cooled, with heat recovery, to the desired temperature (preferably approximately 200° C.), before they are fed to a stack, which is likewise not shown. With sufficient cooling in the second stage, the conventional boiler can, if need be, be omitted entirely.

Figure 2:
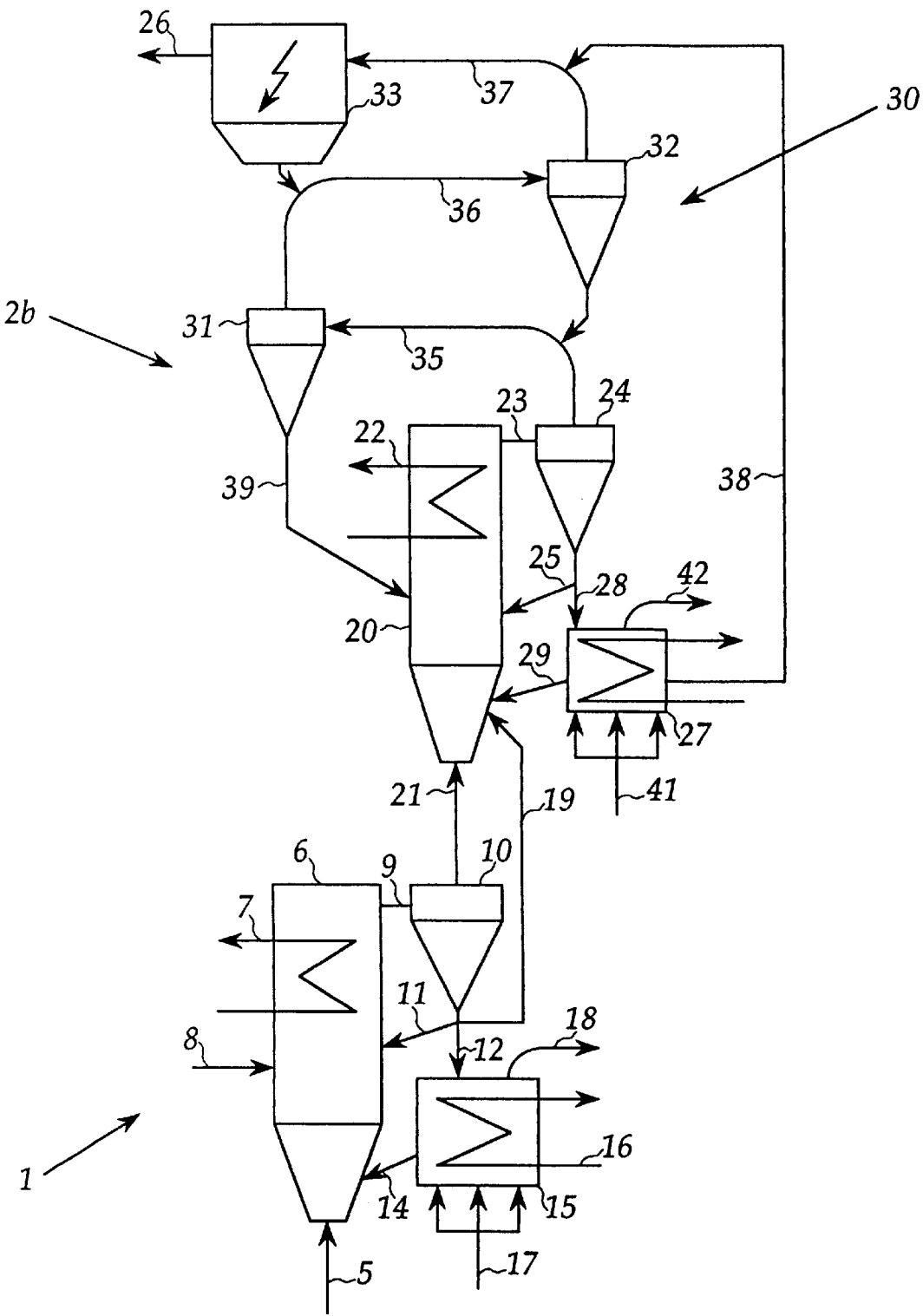
FIG. 2 shows a flow diagram of a second process variant.

In the case of the process variant shown in FIG. 2, the first stage 1 of the process is carried out in the same manner as already described. The elements of the flow diagram which are known from FIG. 1 and remain identical are designated by the same reference numbers in FIG. 2. In this working example, in the second stage 2b, the fluidized-bed reactor 20 is extended by an external fluid-bed cooler 27, in which at least some of the solids, which are separated off in the dust separator 24 and fed via a line 28, are cooled. Some of the cooled solids are then returned to the fluidized-bed reactor 20 via a line 29. A fluidizing gas necessary for operating the fluid-bed cooler 27 is fed to the fluid-bed cooler 27 via a line 41 and taken off again via a line 42 above the fluid bed. In this variant, the additional cooling surfaces in the fluidized bed are not necessary, since the solids cooled in the fluid-bed cooler 27 absorb the heat from the flue gases from the first stage 1, which are still hot, and ensure the cooling.

Downstream of the dust separator 24 is connected a preferably multistage suspension-type gas cooler 30, which has a plurality of dust separator stages 31, 32, 33. The individual dust separator stages 31, 32, 33 can be cyclones, dust filters, electrostatic precipitators and the like; in the working example shown in FIG. 2, an electrostatic precipitator, for example, is provided for the last dust separator stage 33.

Obviously, a different design or a different number of individual dust separator stages 31, 32, 33 would be possible.

From the dust separator 24, the flue gases flow via a line 35 to the first dust separator stage 31; the further connection lines between the dust separator stages 31 and 32 and between 32 and 33 are designated by 36 and 37, respectively.

Some of the solids cooled in the fluid-bed cooler 27 are taken off from the fluid-bed cooler 27 and introduced into the flue gas stream via a line 38 immediately upstream of the last dust separator stage 33. The solids particles cooling the flue gases are entrained by the flue gas stream and are transported via the line 37 to the dust separator stage 33, separated from the flue gases there and introduced into the line 36, where they are again entrained by the flue gas stream and transported to the penultimate dust separator stage 32. Having been removed there, they again pass with the flue gas stream via the line 35 into the dust separator stage 31, from where they are conducted via a line 39 back into the fluidized-bed reactor 20.

Therefore, whereas the flue gases flow each time to the next colder dust separator stage, the solids are transported each time to the next hotter stage, until they are cooled again in the fluid-bed cooler 27.

Figure 3:
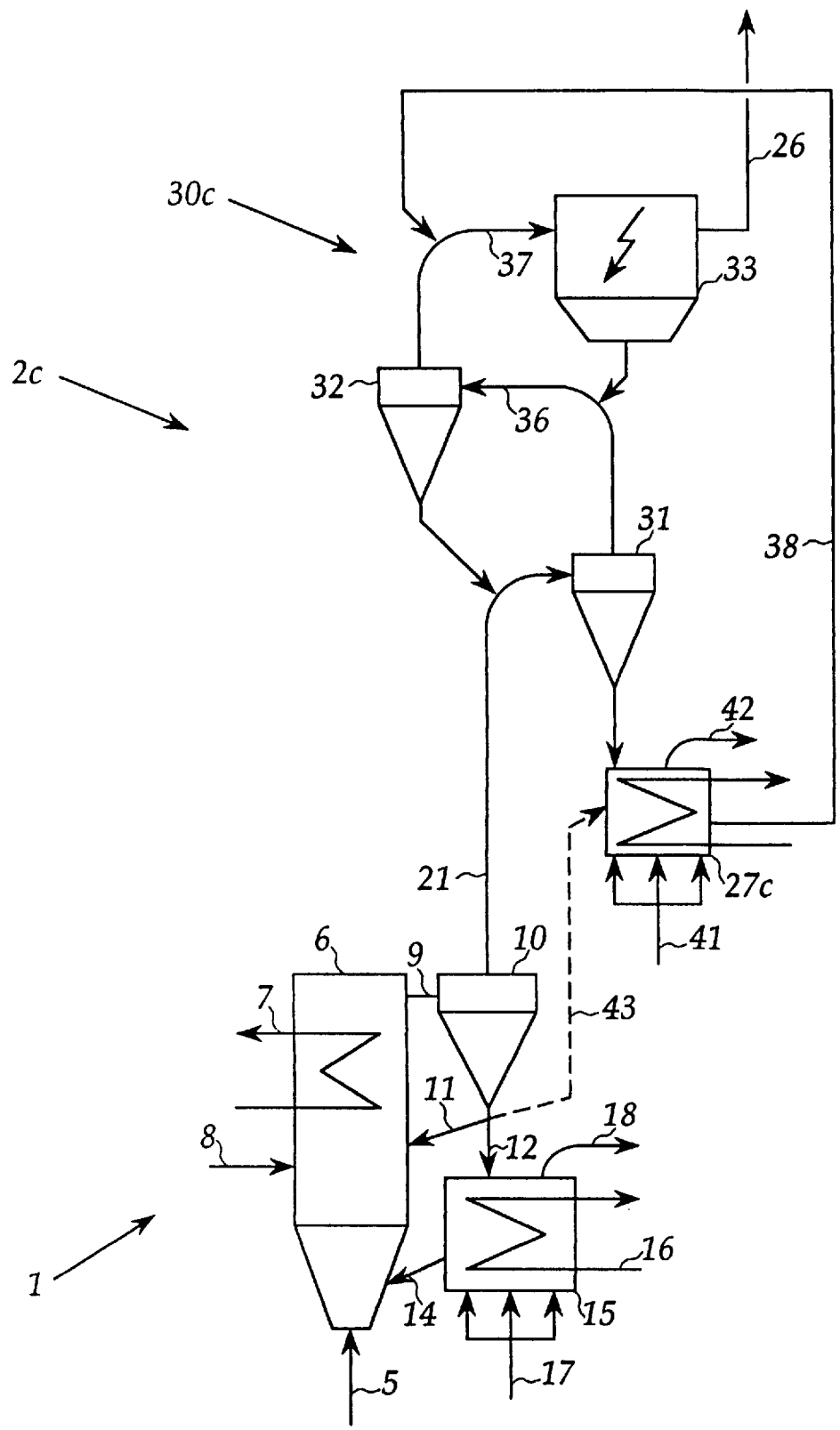
FIG. 3 shows a flow diagram of a third process variant.

In the variant shown in FIG. 3, the second fluidized-bed reactor 20 known from FIGS. 1 and 2 is omitted. Only a fluid-bed cooler 27c and a suspension-type heat exchanger 30c are present to carry out the second stage 2c. The suspension-type heat exchanger 30c is again preferably designed so as to be multistage. In the working example shown in FIG. 3, similarly to FIG. 2, three dust separator stages 31, 32 and 33 are shown; however, in this case also the number and design of the individual stages can be chosen freely depending on requirements.

In this process variant, the dust separator 10 of the first stage 1 can be designed in such a way that the amount of sorbents discharged from the first stage 1 with the flue gases via the line 21 is sufficient for the HCl removal in the second stage 2c. A further possibility is to feed some of the solids separated off in the dust separator 10, complete with unused sorbents, to the fluid-bed cooler 27c (this solids feed is shown dashed in FIG. 3 and is designated 43). In the suspension-type heat exchanger 30c according to FIG. 3, also, similarly to the second process variant according to FIG. 2, the flue gases cooled by the solids originating from the fluid-bed cooler 27c are passed each time into the next colder dust separator stage, while the solids are transported each time to the next hotter stage, until they are cooled again in the fluid-bed cooler 27c.

The flue gas velocity in the line 21 ensures here also that no solids particles pass back into the first stage 1, so that in this variant also, HCl already removed cannot be released again.

Obviously, it would also be possible in the variants according to FIGS. 1 and 2, with an appropriate design of the dust separator 10, to introduce the unused sorbents from the first stage 1 with the flue gases via the line 21 into the second stage 2a or 2b. In all three variants, at any rate, the sorbents could be introduced independently of one another into both stages.

As sorbents, use is made, for example, of the above-described known fine-grained substances for the dry sorption of $SO_2$, HCl or mixtures of such substances.

We claim:

1. A process for cooling and cleaning flue gases containing $SO_2$ and HCl downstream of the thermal treatment of waste, gaseous pollutants of the flue gases being sorbed onto a solid sorbent, wherein the flue gases are brought into contact with sorbent in a first stage as fluidizing gases in a circulating fluidized bed of solid particles at temperatures above 600° C. to remove $SO_2$, at least some of the solid particles and sorbents discharged from the fluidized bed being separated off from the flue gas stream and being at least in part recycled to the fluidized bed and the flue gases from the first stage being brought into contact with sorbent in a second stage at temperatures below 600° C. to remove HCl.

2. The process according to claim 1, wherein the sorbent is used in the first stage in excess.

3. The process according to claim 1, wherein the gas velocity of the flue gases in the fluidized bed (superficial velocity) is 2–10 m/s.

4. The process according to claim 1, wherein at least some of the solids particles separated off from the flue gas stream downstream of the first stage are returned to the fluidized bed via a fluid-bed cooler, the temperature in the fluidized bed being controlled by the input of the solids cooled in the fluid-bed cooler.

5. The process according to claim 1, wherein the second stage of the process is carried out in a second fluidized bed, the solids discharged with the flue gases from the second fluidized bed together with unused sorbent being separated from the flue gas stream in at least one separating stage and being recycled at least in part to the second fluidized bed, so that a circulating fluidized bed is formed.

6. The process according to claim 5, wherein at least some of the solids particles separated off from the flue gas stream in the second stage in the separator stage are returned to the second fluidized bed via a fluid-bed cooler, the temperature in the fluidized bed being controlled by the input of the solids cooled in the fluid-bed cooler.

7. The process according to claim 5, wherein some of the solids particles removed downstream of the first stage together with unused sorbent are passed into the second fluidized bed of the second stage.

8. The process according to claim 6, wherein the flue gases downstream of the second fluidized bed and the separator stage are conducted through a plurality of dust separator stages, some of the solids particles cooled in the fluid-bed cooler being admixed to the flue gas stream, which cools this and after which the solids particles, which are removed again from the flue gas stream in the dust separator stages are recirculated to the second fluidized bed.

9. The process according to claim 8, wherein the solids particles cooled in the fluid-bed cooler are introduced into the flue gas stream upstream of the last dust separator stage and, removed from this, are again fed to the flue gas stream in such a manner that, while the flue gases flow from one dust separator stage to the next colder dust separator stage, the solids particles are transported by the flue gas stream from one dust separator stage to the next, hotter dust separator stage.

10. The process according to claim 1, wherein flue gases leaving the first stage flow in the second stage through a suspension-type heat exchanger, solids particles removed in a first dust separator stage being cooled in a fluid-bed cooler and fed to the flue gas stream, cooling this, and removed again in a plurality of dust separator stages, being recirculated to the fluid-bed cooler.

11. The process according to claim 10, wherein the solids particles cooled in the fluid-bed cooler are introduced into the flue gas stream upstream of the last dust separator stage and, removed in this, are fed again to the flue gas stream in such a manner that, while the flue gases flow from one dust separator stage to the next, colder dust separator stage, the solids particles are transported by the flue gas stream from one dust separator stage to the next hotter dust separator stage.

12. The process according to claim 10, wherein some of the solids particles removed in the dust separator of the first stage are introduced, together with unused sorbent, into the fluid-bed cooler of the second stage.

13. The process according to claim 10, wherein the sorbents unused in the first stage are fed with the flue gas stream to the second stage.

14. Apparatus for treating flue gases comprising: a first fluidized-bed reactor having a downstream first dust separator, a second fluidized-bed reactor having a downstream second dust separator, a connection between the first dust separator and the second fluidized-bed reactor to introduce flue gases into the second fluidized-bed reactor, and a return connection from each dust separator to each fluidized-bed reactor to recirculate solids particles removed in each dust separator, further including an external fluid-bed cooler connected to the second fluidized-bed reactor and to the second dust separator to recirculate solid particles removed in the second dust separator and having a suspension-type heat exchanger connected to the fluid-bed cooler and to the second fluidized-bed reactor to recirculate solid particles removed in the suspension-type heat exchanger.

* * * * *